United States Patent [19]
Kamei et al.

[11] 3,795,087
[45] Mar. 5, 1974

[54] REMOVAL OF HYDROGEN FROM LIQUID SODIUM

[75] Inventors: Hisashi Kamei, Tokyo; Masayoshi Ohno, Yokohama, both of Japan

[73] Assignees: Tokyo Shibaura Electric Co., Ltd., Kawasaki-shi; Nippon Atomic Industry Group Co., Tokyo, both of, Japan; part interest to each

[22] Filed: July 30, 1971

[21] Appl. No.: 167,851

[30] Foreign Application Priority Data
Aug. 3, 1970    Japan.............................. 45/67604

[52] U.S. Cl. ................................................. 55/16
[51] Int. Cl............................................. B01d 53/22
[58] Field of Search ................ 55/16, 158; 210/321

[56] References Cited
UNITED STATES PATENTS

| | | |
|---|---|---|
| 3,192,070 | 6/1965 | Tragert et al............................ 55/16 |
| 3,494,470 | 2/1970 | Banfield.............................. 210/321 |
| 3,452,517 | 7/1969 | Buckland.............................. 55/158 |
| 3,487,751 | 1/1970 | Meijer et al. ........................... 55/16 |
| 3,155,467 | 11/1964 | Yamamoto et al. ..................... 55/16 |
| 3,620,844 | 11/1971 | Wicke et al............................ 55/158 |

*Primary Examiner*—Charles N. Hart
*Attorney, Agent, or Firm*—Oblon, Fisher, Spivak, McClelland & Maier

[57] ABSTRACT

Hydrogen is separated from a fluid, particularly molten sodium, by use of a hydrogen selective semipermeable membrane. A method is provided whereby the membrane is constructed so as to replace a portion of a pipe for containing said molten sodium. In a second embodiment, the method is disclosed whereby a tank for containing said molten sodium, is provided with a hollow tube at least partly constructed with said membrane.

1 Claim, 5 Drawing Figures

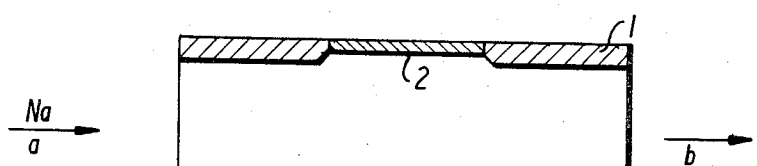
FIG. 1
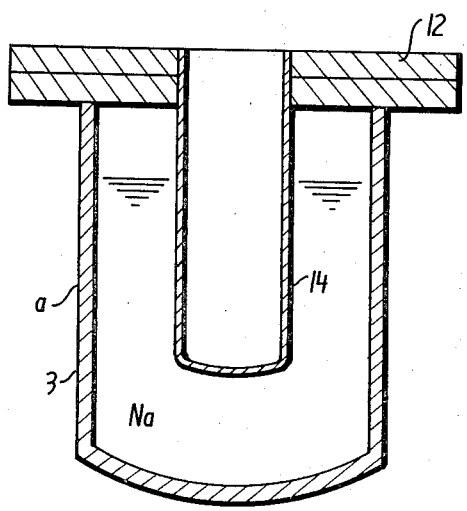
FIG. 2
FIG. 3
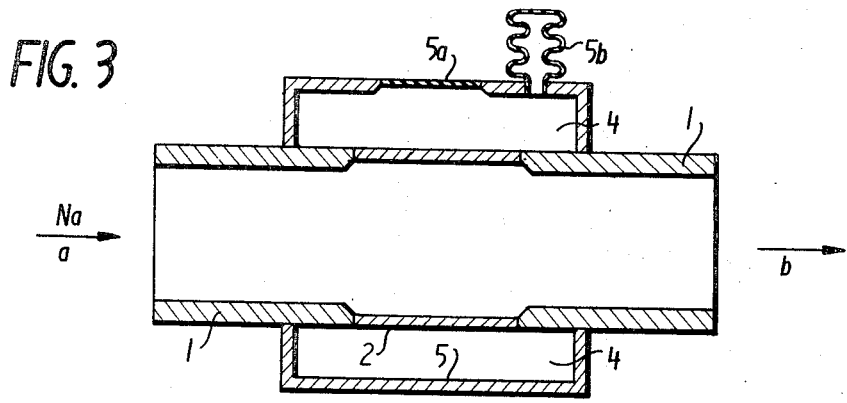

REMOVAL OF HYDROGEN FROM LIQUID SODIUM

BACKGROUND OF THE INVENTION

1. Field Of The Invention

This invention relates generally to a technique for separating hydrogen from a fluid, particularly for separating hydrogen from a liquid containing hydrogen dissolved or dispersed therein, and more particularly for separating hydrogen from molten sodium. This invention further relates to an apparatus for carrying out said technique.

2. Description Of The Prior Art

Molten sodium is frequently used as a coolant in fast breeder nuclear reactors. After removing the heat from the reactor, it gives up some of its heat by steam generation in a secondary heat exchange system. During this secondary heat exchange, hydrogen and oxygen frequently become entrapped in the sodium, either by dissolution, by dispersion, or both, and must be removed before the molten metal is recycled back to the reactor. Other impurities must also be removed, such as hydrogen, carbon, nitrogen, oxygen, metals, fission products or the like.

One technique used in the prior art to remove these impurities is the use of a "cold trap filter." The disadvantages of the cold trap filter technique, however, are that (1) only oxides are effectively removed and (2) the cold trap filter must periodically be shut down and regenerated.

Another technique which has been used in the prior art to remove these impurities is to distill the molten sodium. This expedient, however, is quite expensive and it is difficult to integrate into a continuously recirculating system.

Although several techniques are available for effectively removing other impurities from molten sodium, a need exists for methods of effectively removing hydrogen. Although the primary object of this invention was to develop a technique for removing hydrogen from molten sodium, it has been found that the technique hereinafter described, has a much wider applicability to separation of hydrogen from all types of fluid medium, whether gaseous or liquid and in particular to liquid fluid systems, and more particularly to high temperature liquid fluid systems.

SUMMARY OF THE INVENTION

Accordingly, it is one object of this invention to provide a technique for separating hydrogen from a fluid medium, either gaseous or liquid.

It is another object of this invention to provide a technique for separating hydrogen from a liquid medium and more particularly from a high temperature liquid medium.

Still another object of this invention is to provide a method for separating hydrogen from molten sodium.

A further object of this invention is to provide apparatus for accomplishing said separation.

These and other objects have now herein been attained by bringing the fluid medium, containing the hydrogen dissolved and/or dispersed therein, into contact with a hydrogen-permeable membrane, through which hydrogen can be selectively diffused.

BRIEF DESCRIPTION OF THE DRAWINGS

The present invention will now be further described by reference to certain specific examples, in which the reference numbers in the description refer to like reference numbers in the drawings, in which:

FIG. 1 is a sectional view of apparatus which may be used for carrying out the technique of the invention.

FIGS. 2 - 5 are diagrammatic views of other types of apparatus which are suitable for carrying out the present invention.

DETAILED DESCRIPTION OF THE INVENTION

Figure 4:
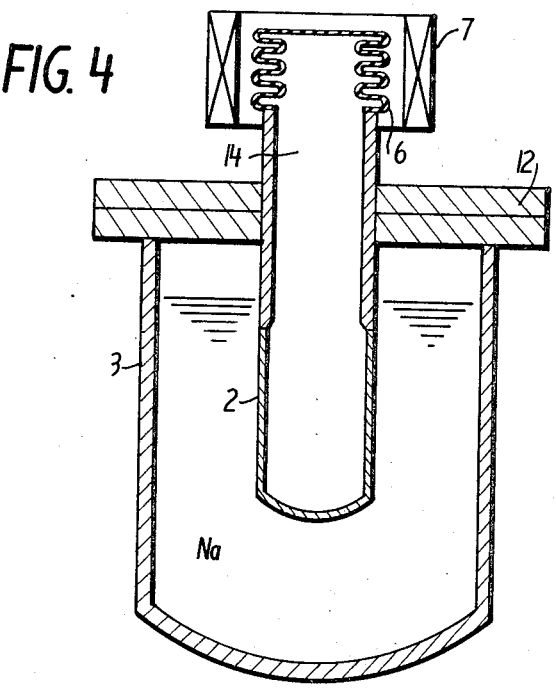

The semi-permeable membrane for selective diffusion of hydrogen from a fluid medium may be prepared from nickel, palladium, tungsten, platinum, Hastelloy B, PH15-7, MOSS, AISI-316SS or the like. The hydrogen does not have to diffuse entirely through the semi-permeable material and hydrogen absorbents such as palladium sponge or platinum sponge or the like may be used. As used in the present application, the term "semi-permeable material" is intended to encompass both semi-permeable membranes as well as semi-permeable absorbents.

The semi-permeable material may be a membrane, which replaces a portion of the pipe carrying the hydrogen containing fluid medium, as shown in FIG. 1. In that Figure, a stainless steel pipe 1 has a portion of its wall replaced with a hydrogen permeable membrane 2. Hydrogen is the molten sodium, contained within pipe 1 and flowing in direction $a$–$b$, will diffuse through the membrane 2 and out of the system.

Another suitable apparatus is shown in FIG. 2. In this Figure, the molten sodium containing hydrogen is fed into a tank 3. A hollow cylinder 14 formed from the semi-permeable material is contained within tank 3, and is closed at its lower end. The tank is covered with stoppers 12. The hollow cylinder 14 extends from a point beneath the molten sodium level so that its closed end is beneath the surface, and its upper end protrudes through stoppers 12. Hydrogen diffusing into the hollow cylinder 2 passes through the hollow portion and out of the system.

The atmosphere outside the system may be air (partial pressure of $H_2 = 0.076$ mmHg) or it may be any gas which is non-reactive with hydrogen. The only limitation is that the partial pressure of hydrogen in the gas must be lower than in the molten sodium so that there will be a driving force to cause the hydrogen to diffuse through the permeable material. For instance, if 84 ppm hydrogen is contained in molten sodium at a temperature of 330°C., the hydrogen partial pressure will be 24 mmHg. Since the partial pressure of hydrogen in air is 0.076, there will be an adequate driving force to cause the hydrogen to diffuse through the membrane and out of the system.

FIG. 3 shows a modification of the embodiment of FIG. 1. In this embodiment, a safety chamber is provided which serves to prevent the loss of sodium in the event that the semi-permeable membrane should rupture. A second chamber 4 is provided, surrounding the area of the semi-permeable membrane 2. Hydrogen passing through membrane 2 enters chamber 4 and then passes through chamber 4 through a second semi-permeable membrane 5a. If sodium should escape through membrane 2 it will become entrapped in chamber 4. The atmosphere within the chamber 4 may be a gas having a hydrogen partial pressure between the hydrogen partial pressure in molten sodium and outside the system. The gas pressure in chamber 4 should approximate the pressure of the liquid sodium on the sodium side of membrane 2 to prevent membrane damage and to prevent the loss of significant amounts of sodium into chamber 4. A safety valve (not shown) or a bellows 5b is provided for chamber 4 to compensate for any sudden changes in gas volume.

FIG. 4 is a similar embodiment as FIG. 2, except with the addition of a bellows chamber 6 or diaphragm consisting of a hydrogen permeable membrane which renders the hollow tube 14 air-tight. A heater 7 is provided around the bellows 6 so that the membrane may be heated. The purpose of the bellows is to equalize the pressure on the inside of the hollow tube so that it approximates the pressure of the molten sodium on the semi-permeable membrane. By equalizing the pressure, damage to the membrane can be minimized. For this purpose, the hollow tube may be filled with a gas which is non-reactive toward hydrogen and which has a lower hydrogen partial pressure than molten sodium.

When the bellows 6 is heated to 600° – 700°C., the diffusion constant in chamber 4 increases and the hydrogen tends to diffuse readily out of the system. This reduces the partial pressure of the hydrogen in the chamber and speeds the diffusion of the hydrogen from the molten sodium.

A vacuum gauge may be mounted in the chamber to measure the quantity of hydrogen being separated.

Figure 5:
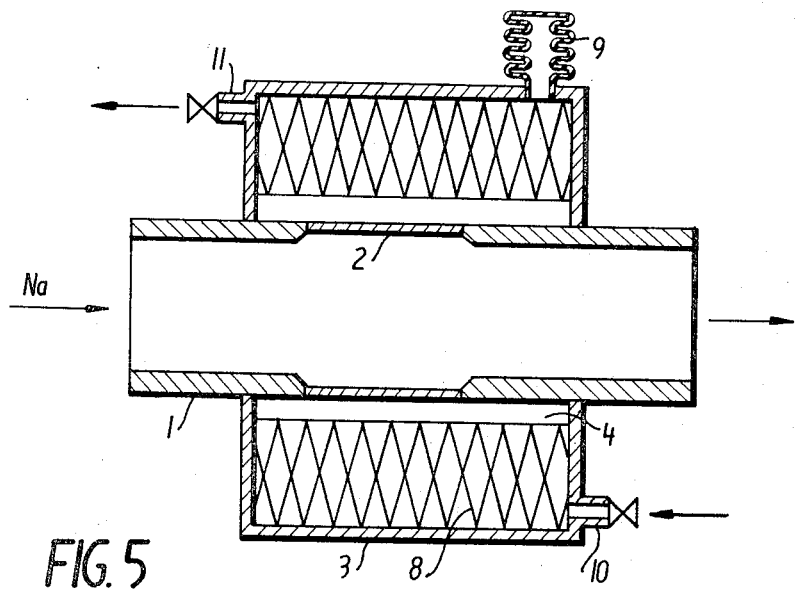

FIG. 5 is an embodiment which is similar to FIG. 3, except that instead of the second membrane 5a in chamber 4, a hydrogen absorbent 8 may be used. The temperature of the absorbent is preferably below 100°C. An inlet 10 and an outlet 11 are provided to and from the absorbent. A hot blast, at a temperature of higher than 200°C. is passed through the absorbent by means of a blower (not shown). A bellows 9 is connected to chamber 4.

This embodiment enables the partial pressure of the hydrogen in the chamber 4 to be very low so that the hydrogen concentration gradient is steep permitting rapid separation from the molten sodium.

In general, the thicker the membrane or absorbent used, the slower will be the rate of hydrogen diffusion. The greater the surface area, the faster will be the rate of diffusion; and the higher the temperature, the faster will be the rate of diffusion.

Although the above discussion related specifically to separating hydrogen from molten sodium, as was earlier discussed briefly, this invention can be used with a large variety of other gases or liquids containing hydrogen dissolved and/or dispersed therein.

Having now fully described the invention, it will be apparent to one of ordinary skill in the art that many changes and modifications can be made thereto without departing from the spirit or scope of the invention. Accordingly,

What is claimed as new and desired to be secured by Letters Patent of the united states is:

1. A process for separating hydrogen from molten sodium containing hydrogen therein which comprises containing said molten sodium in contact with a hydrogen selective semi-permeable membrane so that hydrogen is selectively diffused through said membrane.

\* \* \* \* \*